US012028798B2

(12) United States Patent
Welin et al.

(10) Patent No.: US 12,028,798 B2
(45) Date of Patent: Jul. 2, 2024

(54) METHODS, WIRELESS COMMUNICATION DEVICES AND SYSTEMS ADAPTED FOR NETWORK SLICING SCENARIOS

(71) Applicant: TELEFONAKTIEBOLAGET LM ERICSSON (PUBL), Stockholm (SE)

(72) Inventors: Annikki Welin, Solna (SE); Catalin Meirosu, Sollentuna (SE); Jon Reveman, Vaxholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 628 days.

(21) Appl. No.: 17/283,294

(22) PCT Filed: Oct. 29, 2018

(86) PCT No.: PCT/SE2018/051102
§ 371 (c)(1),
(2) Date: Apr. 7, 2021

(87) PCT Pub. No.: WO2020/091636
PCT Pub. Date: May 7, 2020

(65) Prior Publication Data
US 2021/0392575 A1    Dec. 16, 2021

(51) Int. Cl.
*H04W 48/18* (2009.01)
*H04L 1/1867* (2023.01)
*H04W 72/23* (2023.01)

(52) U.S. Cl.
CPC .......... *H04W 48/18* (2013.01); *H04L 1/1896* (2013.01); *H04W 72/23* (2023.01)

(58) Field of Classification Search
None
See application file for complete search history.

(56) References Cited

U.S. PATENT DOCUMENTS 10,863,556 B2 * 12/2020 Lau .................. H04W 48/10
11,632,714 B2 *  4/2023 Opsenica ........... H04W 12/06
                                                       370/329

(Continued)

FOREIGN PATENT DOCUMENTS

WO    2017140375 A1    8/2017
WO    2018034924 A1    2/2018

OTHER PUBLICATIONS

3GPP TS 23.501 V15.3.0, "3rd Generation Partnership Project; Technical Specification Group Services and System Aspects," System Architecture for the 5G System; Stage 2 (Release 15), Chapter 5.15, Sep. 2018, 226 pages.

(Continued)

Primary Examiner — Lonnie V Sweet
(74) Attorney, Agent, or Firm — Sage Patent Group

(57) ABSTRACT

Disclosed is a method performed by a wireless communication device for communicating with a wireless communication network, the network having network slices available for providing wireless access to the device, the network slices having mutually different network capabilities in terms of e.g. latency, bandwidth and reliability. The method comprises receiving, from the network, information on the network capabilities of the network slices, and obtaining a request from an application program of the device for communication resources. The method further comprises obtaining information on network capability preferences of the application program, and selecting one of the network slices for the application program based on the information on capabilities of the network slices and on the information on capability preferences of the application program. The method further comprises sending a request to the network for communication resources to use for communication over the selected network slice, and receiving, from the network, (Continued)

information on the communication resources to use for communication over the selected network slice.

20 Claims, 5 Drawing Sheets

(56) References Cited

U.S. PATENT DOCUMENTS

| | | | |
|---|---|---|---|
| 2017/0332421 A1 | 11/2017 | Sternberg et al. | |
| 2018/0310238 A1* | 10/2018 | Opsenica | H04W 72/21 |
| 2018/0368053 A1* | 12/2018 | Wei | H04W 48/14 |
| 2019/0053146 A1* | 2/2019 | Shimojou | G06F 9/50 |
| 2020/0107250 A1* | 4/2020 | So | H04W 48/18 |
| 2020/0120721 A1* | 4/2020 | Lau | H04W 76/11 |
| 2021/0084523 A1* | 3/2021 | Kucera | H04W 28/06 |
| 2021/0385724 A1* | 12/2021 | Wang | H04L 41/5051 |
| 2023/0171684 A1* | 6/2023 | Sasindran | H04W 76/12 370/328 |

OTHER PUBLICATIONS

3GPP TS 23.503 V15.3.0, "3rd Generation Partnership Project; Technical Specification Group Services and System Aspects," Policy and Charging Control Framework for the 5G System; Stage 2 (Release 15), Sep. 2018, pp. 1-70.

GSM Association, "GSMA—An introduction to Network Slicing," 2017, Internet at https://www.gsma.com/futurenetworks/wp-content/uploads/2017/11/GSMA-An-Introduction-to-Network-Slicing.pdf., pp. 1-20.

International Search Report / Written Opinion dated Jun. 28, 2019 in related/corresponding PCT Application No. PCT/SE2018/051102.

* cited by examiner

METHODS, WIRELESS COMMUNICATION DEVICES AND SYSTEMS ADAPTED FOR NETWORK SLICING SCENARIOS

TECHNICAL FIELD

The present disclosure relates generally to methods, a system of a wireless communication network and a wireless communication device for communication between the wireless communication device and the system. More specifically, the present disclosure relates to a method and a wireless communication device for communicating with a wireless communication network having a plurality of network slices with mutually different network capabilities for providing wireless access to the wireless communication device. Further, more specifically, the present disclosure relates to a method and a system of a wireless communication network having a plurality of network slices with mutually different network capabilities for providing wireless access to a wireless communication device. The present disclosure further relates to computer programs and carriers corresponding to the above methods.

BACKGROUND

Wireless communication continues to develop and now reaches segments of the industry such as automotive, logistics etc., as well as financial and healthcare sectors. Such diversified businesses have diversified and even conflicting communication capability requirements. One business customer, such as a hospital, may require ultra-reliable services, whereas another business customer may need ultra-high bandwidth communication and yet another may need extremely low latency. The wireless communication network needs to be designed to be able to offer a different mix of capabilities to meet all these diverse requirements at the same time.

One possible way to provide those diverse requirements at the same time is to build a set of dedicated, parallel communication networks, each network being adapted to serve one type of customer. However, such parallel communication networks would become too expensive.

A much more efficient approach is to provide multiple virtual dedicated networks on a common physical platform. This concept is called Network slicing. Network slicing is described in the document "GSMA—An introduction to Network Slicing", published 2017 by the GSM Association, and found on the Internet at https://www.gsma.com/future-networks/wp-content/uploads/2017/11/GSMA-An-Introduction-to-Network-Slicing.pdf. From a mobile operator's point of view, a network slice is an independent end-to-end logical network that at least partly runs on a shared physical infrastructure, the network slice being adapted to provide a negotiated service quality in terms of network capabilities such as latency, bandwidth and reliability. For example, one such network slice may be adapted for providing a robust, scalable connection, such as for serving Internet of Things (IoT) devices, one network slice may be adapted for providing high bandwidth, such as needed for automotive applications, and one network slice may be adapted for providing low latency, as needed in manufacturing applications, i.e. for robots in a factory.

3GPP standard document TS 23.501, release 15.3.0, Chapter 5.15, pages 131-144 and dated September 2018, defines how communication is to take part in a communication network using the network slicing concept. On a mobile communication device there may be many application programs (also called "applications") running simultaneously, the applications having differing requirements for network capabilities. In order to provide the different applications with the best service, a wireless communication device can have access to multiple network slices simultaneously, maximum 8 slices according to 3GPP TS 23.501 over the same radio access network, i.e. the same radio interface. Each network slice may then serve a certain service type with agreed upon service-level agreement.

TS 23.501 defines: "Network Function" as a 3GPP defined processing function in a network, which has defined functional behavior and 3GPP defined interfaces; "Network Slice" as a logical network that provides specific network capabilities and network characteristics, and "Slice Instance" as a set of Network Function instances and required resources, which form a deployed Network Slice.

In TS 23.501, Slice/Service Type (SST) values are standardized that are to reflect the most commonly used SSTs that could assist with global interoperability for slicing. The SSTs defined are enhanced Mobile Broadband (eMBB), Ultra Reliable Low Latency Communications (URLLC) and Massive IoT (MIoT), as shown in Table 1 below, which is Table 5.15.2.2-1 of Release 15.3.0 of 3GPP TS 23.501.

TABLE 1

| Slice/Service type | SST value | Characteristics |
|---|---|---|
| eMBB | 1 | Slice suitable for the handling of 5G enhanced Mobile Broadband. |
| URLLC | 2 | Slice suitable for the handling of ultra- reliable low latency communications. |
| MIoT | 3 | Slice suitable for the handling of massive IoT. |

Even though there are only those three SSTs defined today, it is envisioned that slices may be customized according to many different communication network capabilities (also called "network capabilities"), such as latency, data security, energy efficiency, mobility, massive connectivity, reachability, guaranteed Quality of Service (QoS), throughput etc. Taking into account that different network slices may have different degrees of those different network capabilties, there is no end to the amount of different network slices or slices types that can be customized in a network. Page 10 of the above cited document "GSMA—An introduction to Network Slicing" shows an example of how a slice can be customized and how advanced a set of network services can be delivered by such a slice.

There is today not described how a wireless communication device should do to connect to a network slice suitable for a certain application and use the application over the suitable network slice. In other words, there is no information on how to deploy the slicing concept from the perspective of the wireless communication device. Furthermore, the current procedure assumes a wireless communication device is preconfigured with a slice ID that could be used during attach procedures and it is not described what is required from a slice, in terms of network capabilities. How these slice IDs are configured initially in the wireless communication device is not discussed, nor is it shown how they could be continuously maintained up to date given user mobility and slice availability throughout the network.

Furthermore, on the wireless communication device, it is applications that need to make use and request access to such slices, and for example the current socket Application Programming Interface (API) in Android© allows setting only Internet Engineering Task Force (IETF)-specified parameters such as a Type of Service (ToS) field, which are clearly unsuited for being used as Slice IDs and are not enough to specify Capabilities and Services to determine the appropriate slice.

There is also an issue with selecting the correct slice to the application. In 3GPP TS 23.503, version 15.3.0, section 6.1.2.2 it is described that the Policy Control Function (PCF) in the core network selects applicable UE Route Selection Policies (URSP) and communicates them to the wireless communication device, while the wireless communication device acts in accordance by adding traffic to Protocol Data Unit (PDU) session(s) or creating a new one if needed. The issue with this approach is that the operator of the wireless communication network needs to have knowledge of all existing applications and even slices that exist in different locations.

As shown above, there is a need of a solution how to make it possible to match applications in wireless communication devices with available network slices.

SUMMARY

It is an object of the invention to address at least some of the problems and issues outlined above. It is an object of embodiments of the invention to provide an application of a wireless communication device with a network slice having network capabilities that would suit the application. It is possible to achieve these objects and others by using methods, systems and wireless communication devices as defined in the attached independent claims.

According to one aspect, a method is provided performed by a wireless communication device for communicating with a wireless communication network. The network has a plurality of network slices available for providing wireless access to the wireless communication device. The plurality of network slices have mutually different network capabilities in terms of e.g. latency, bandwidth and reliability. The method comprises receiving, from the wireless communication network, information on the network capabilities of the plurality of available network slices, obtaining a request from an application program of the wireless communication device for communication resources for communicating through the wireless communication network, and obtaining information on network capability preferences of the application program. The method further comprises selecting a network slice from the plurality of network slices for the application program based on the information on network capabilities of the plurality of available network slices and on the information on network capability preferences of the application program. The method further comprises sending a request to the wireless communication network for communication resources to use for communication over the selected network slice, and receiving, from the wireless communication network, information on the communication resources to use for communication over the selected network slice.

According to another aspect, a method is provided performed by a system of a wireless communication network for providing wireless access to a wireless communication device. The communication network has a plurality of network slices available for providing wireless access to the wireless communication device. The plurality of network slices have mutually different network capabilities in terms of e.g. latency, bandwidth and reliability. The method comprises sending, to the wireless communication device, information on the network capabilities of the plurality of available network slices, and receiving, from the wireless communication device, a request for communication resources to use for communication over a network slice selected by the wireless communication device from the plurality of network slices, for an application program. The method further comprises determining whether to grant the wireless communication device communication resources for the selected network slice, and, when communication resources are granted, sending, to the wireless communication device, information on the granted communication resources to use for communication over the selected slice.

According to another aspect, a wireless communication device is provided configured to communicate with a wireless communication network 100, the network having a plurality of network slices available for providing wireless access to the wireless communication device. The plurality of network slices have mutually different network capabilities in terms of e.g. latency, bandwidth and reliability. The wireless communication device comprises a processing circuitry and a memory. The memory contains instructions executable by said processing circuitry, whereby the wireless communication device is operative for receiving, from the wireless communication network, information on the network capabilities of the plurality of available network slices and obtaining a request from an application program of the wireless communication device for communication resources for communicating through the wireless communication network. The wireless device is further operative for obtaining information on network capability preferences of the application program, and selecting a network slice from the plurality of network slices for the application program based on the information on network capabilities of the plurality of available network slices and on the information on network capability preferences of the application program. The wireless device is further operative for sending a request to the wireless communication network for communication resources to use for communication over the selected network slice, and receiving, from the wireless communication network, information on the communication resources to use for communication over the selected network slice.

According to another aspect, a system is provided operable in a wireless communication network for providing wireless access to a wireless communication device. The communication network has a plurality of network slices available for providing radio access to the wireless communication device. The plurality of network slices have mutually different network capabilities in terms of e.g. latency, bandwidth and reliability. The system comprises a processing circuitry and a memory. The memory contains instructions executable by said processing circuitry, whereby the system is operative for sending, to the wireless communication device, information on the network capabilities of the plurality of available network slices, and receiving, from the wireless communication device, a request for communication resources to use for communication over a network slice selected by the wireless communication device from the plurality of network slices, for an application program. The system is further operative for determining whether to grant the wireless communication device communication resources for the selected network slice, and, when communication resources are granted, sending, to the wireless communication device, information on the granted communication resources to use for communication over the selected slice.

According to other aspects, computer programs and carriers are also provided, the details of which will be described in the claims and the detailed description.

Further possible features and benefits of this solution will become apparent from the detailed description below.

BRIEF DESCRIPTION OF DRAWINGS

The solution will now be described in more detail by means of exemplary embodiments and with reference to the accompanying drawings, in which.

DETAILED DESCRIPTION

Figure 1:
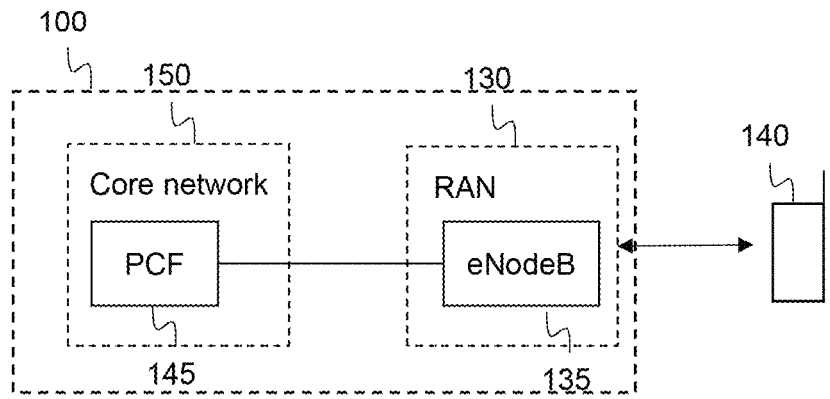
FIG. 1 is a schematic block diagram illustrating a wireless communication scenario in which the present invention may be used.

FIG. 1 shows a wireless communication network 100 comprising a radio access network (RAN) 130 and a core network 150. The RAN 130 comprises a RAN node, e.g. an eNodeB 135 that is adapted for wireless communication with a wireless communication device 140. The core network 150 comprises a policy control function (PCF) 145 that may be used in the present invention. The PCF supports a unified policy framework that governs network behavior. In so doing, it provides policy rules to control plane function(s) to enforce them The wireless communication network 100 may be any kind of wireless communication network that can provide radio access to wireless communication devices. Example of such wireless communication networks are Long Term Evolution (LTE), LTE Advanced, Wireless Local Area Networks (WLAN), as well as fifth generation wireless communication networks based on technology such as New Radio (NR).

The RAN node 135 may be any kind of network node that provides wireless access to a wireless communication device 140 alone or in combination with another network node. Examples of RAN nodes 135 are an evolved Node B or eNodeB (eNB), a gNodeB (gNB), a Multi-cell/multicast Coordination Entity, a relay node, an access point (AP), a radio AP, a remote radio unit (RRU), a remote radio head (RRH) and a multi-standard BS (MSR BS).

The wireless communication device 140 may be any type of device capable of wirelessly communicating with a RAN node 135 using radio signals. For example, the wireless communication device 140 may be a User Equipment (UE), a machine type UE or a UE capable of machine to machine (M2M) communication, a sensor, a tablet, a mobile terminal, a smart phone, a laptop embedded equipped (LEE), a laptop mounted equipment (LME), a USB dongle, a Customer Premises Equipment (CPE) etc.

Figure 2:
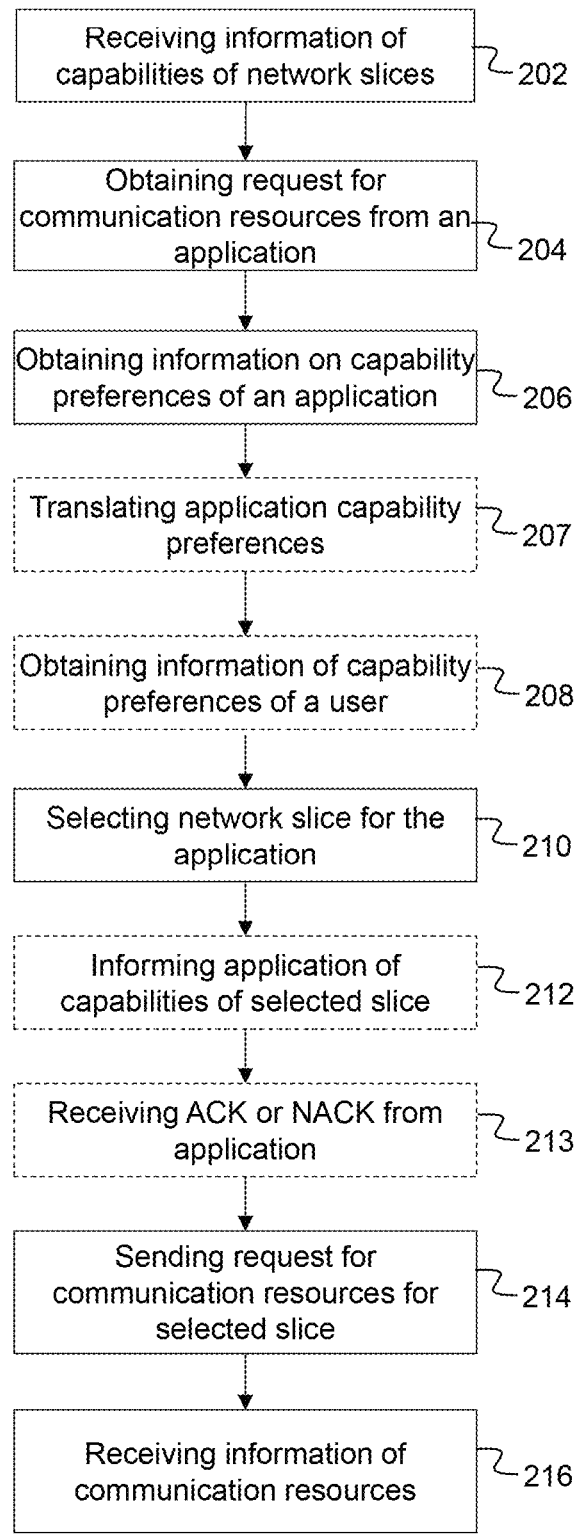
FIG. 2 is a flow chart illustrating a method performed by a wireless communication device, according to possible embodiments.

FIG. 2, in conjunction with FIG. 1, describes a method according to an embodiment, performed by a wireless communication device 140 for communicating with a wireless communication network 100, the network having a plurality of network slices available for providing wireless access to the wireless communication device 140. The plurality of network slices have mutually different network capabilities in terms of e.g. latency, bandwidth and reliability. The method comprises receiving 202, from the wireless communication network 100, information on the network capabilities of the plurality of available network slices, obtaining 204 a request from an application program of the wireless communication device 140 for communication resources for communicating through the wireless communication network 100, and obtaining 206 information on network capability preferences of the application program. The method further comprises selecting 210 a network slice from the plurality of network slices for the application program based on the information on network capabilities of the plurality of available network slices and on the information on network capability preferences of the application program. The method further comprises sending 214 a request to the wireless communication network 100 for communication resources to use for communication over the selected network slice, and receiving 216, from the wireless communication network 100, information on the communication resources to use for communication over the selected network slice.

The application program may be an application program that is used by the device, or to be used by the device. The steps of obtaining a request of communication resources from an application program as well as of obtaining information on network capability preferences of the application program may be achieved by the application program contacting a broker function that performs the method in the communication device though e.g. an application program interface (API) and asks the communication network for access to a network slice with certain capabilities. The broker function may listen onto a network stack in the communication device for requests of communication resources. In such a realization, the broker function may be the part of the communication device that performs the claimed method.

The obtaining of capability preferences of the application program may be achieved by receiving the capability preferences from the application program, e.g. together with receiving the request of communication resources. The request of communication resources from the application program may then be in the form of application code that requests network capabilities according to the preferences of the application program. Alternatively, the capability preferences of the application program may be preconfigured at the broker function. In that case the broker function obtains the network capability preferences from a local storage. The sending of a request to the wireless communication network for communication resources over the selected network slice may be accomplished by requesting to establish a new PDU session on the selected network slice. In response, the communication device may receive a session ID, which is then an example of the information on communication resources that the communication device receives. An "application program" is equivalent to an "application" or an "application function".

By such a method it is possible for the wireless communication device to select which network slice that is most suitable for communications for a certain application on the device.

According to an embodiment, the method further comprises informing 212 the application program of the network capabilities of the selected network slice, and, in response to the informing 212, receiving 213 an acknowledgement or a non-acknowledgement from the application program of the selected network slice, and only sending 214 a request to the wireless communication network 100 for communication resources to use for communication over the selected network slice when an acknowledgement is received. Hereby it is possible for the application program to decline usage of the selected network slice. This could be advantageous if the network capabilities of the selected network slice are considered too bad by the application program. Then the application program may rather wait until a better network slice is available than connecting with the offered slice.

According to another embodiment, the selection 210 of network slice is based on user preferences of network capabilities of a user of the wireless communication device 140, as well as on the network capability preferences of the application program. Hereby, a user of the communication device can set its preferred preferences for its different application programs, and the method will automatically take the user preferences into consideration when selecting network slice for the application program. The user preferences can be in the form of rules for selecting network slices.

According to an alternative of this embodiment, the method further comprises obtaining 208 information on the user preferences from a user interface of the wireless communication device or from a stored user preference profile. Hereby the user has the possibility to itself provide what preferences he/she has on network capabilities for the concerned application program.

According to another embodiment, the application program comprises a first application program and at least a second application program, wherein the first application program has first network capability preferences and the second application program has second network capability preference. Further, the selecting 210 comprises selecting a first of the plurality of network slices for the first application program and a second of the plurality of network slices for the second application program. Further, the sending 214 comprises sending a request to the wireless communication network 100 for communication resources to use for communication over the first network slice for the first application program and for communication resources to use for communication over the second network slice for the second application program. Further, the receiving 216 of information on communication resources comprises receiving information on the communication resources to use for communication over the first network slice and information on the communication resources to use for communication over the second network slice. Hereby it is possible for different application programs on the same wireless communication device to communicate with the communication network using two different network slices having mutually different network capabilities. For example, on one and the same wireless communication device, a normal network slice with eMBB characteristics can be used for most application traffic, while a certain work-related application can use a network slice with ultra-reliable characteristics simultaneously.

According to another embodiment, the method further comprises translating 207 the information related to network capability preferences of an application program into information comparable to the information on network capabilities of the plurality of available network slices. For example, if an application is an FPS Game (FPS=First Person Shooter), it normally needs low latency e.g. <10 ms, both uplink and downlink, a guaranteed bitrate of about 10 Mbit/s uplink, and a medium reliability. The wireless device has this information stored about FPS games. If an FPS game application requests a network slice and the information related to capability preferences that it provides to the wireless device is that it is an FPS game, the wireless device translates the information "FPS game" into the features of low latency, guaranteed bitrate and medium reliability as defined above and compares this to the existing network slices. If the existing network slices are the slices as defined in Table 1 above, the wireless device would select a URLLC slice for the FPS game.

According to another embodiment, the method further comprises obtaining, from the application program, a suggested network slice from the available network slices. Further, the communication device takes the suggested network slice into consideration when performing the selection 210 of network slice for the application program. In other words, the application is given the opportunity to suggest a certain network slice type that it would like to use, based on the network capabilities of the plurality of available network slices. If the communication device, e.g. a broker in the device, considers this suggested network slice to be applicable for the application program, it selects the suggested network slice, if not, it can select another network slice.

According to another embodiment, the wireless communication device 140 comprises slice broker functionality that is arranged to perform any of the above described embodiments of the method.

Figure 3:
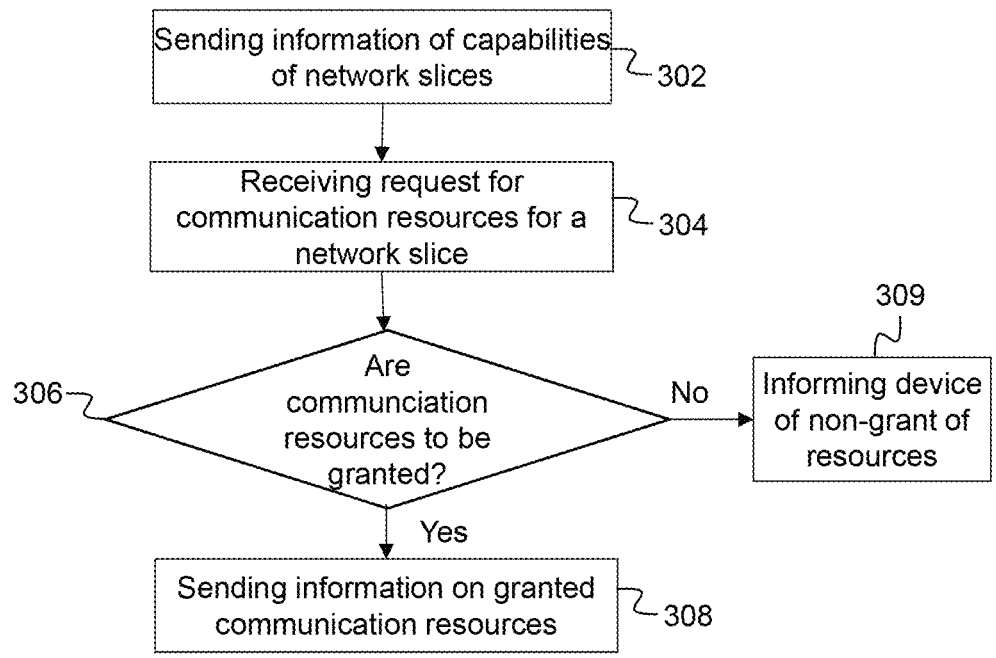
FIG. 3 is a flow chart illustrating a method performed by a system of a wireless communication network, according to possible embodiments.

FIG. 3, in conjunction with FIG. 1, describes a method according to an embodiment, performed by a system of a wireless communication network 100 for providing wireless access to a wireless communication device 140. The communication network 100 has a plurality of network slices available for providing wireless access to the wireless communication device 140. The plurality of network slices have mutually different network capabilities in terms of e.g. latency, bandwidth and reliability. The method comprises sending 302, to the wireless communication device 140, information on the network capabilities of the plurality of available network slices, and receiving 304, from the wireless communication device 140, a request for communication resources to use for communication over a network slice selected by the wireless communication device from the plurality of network slices, for an application program. The method further comprises determining 306 whether to grant the wireless communication device 140 communication resources for the selected network slice, and, when communication resources are granted, sending 308, to the wireless communication device 140, information on the granted communication resources to use for communication over the selected slice.

By such a method, the wireless communication device is given the ability to select network slice itself, based on network capability preferences. However, the decision whether to grant the device communication resources is still at the network. This makes a selection possible locally at the communication device, which can provide the application program with a network slice with suitable network capabilities. However, in case e.g. there are no communication resources left, or the network for any other reason finds it not suitable to grant communication resources to the communication device, the network still has control over the granting of access to its communication resources.

The system of the wireless communication network that performs the method may be a network node, such as a node of the core network 150 or a node of the radio access network 130, or a physical or virtual unit in the network node. For example, the system may be the PCF 145, or a part of the PCF 145. In this case, the node of the core network, e.g. the PCF 145, communicates with the wireless communication device 140 via the BS 135 to which the communication device 140 has a radio connection. Alternatively, the system of the wireless communication network that performs the method may be a group of network nodes, wherein functionality for performing the method are spread out over different physical, or virtual, nodes of the network. In other words, the system may be implemented as a cloud-solution, i.e. the system may be deployed as cloud computing resources that may be distributed in the communication network.

According to an embodiment, the method further comprises, when communication resources are not granted, informing 309 the wireless communication device 140 of the non-grant of communication resources.

According to another embodiment, the receiving 304 comprises receiving a first request for communication resources to use for communication over a first network slice selected by the wireless communication device 140 from the plurality of network slices for a first application program, and receiving a second request for communication resources to use for communication over a second network slice selected by the wireless communication device 140 from the plurality of network slices for a second application program. Further, the determining 306 comprises determining whether to grant the wireless communication device communication resources for the first network slice and whether to grant the wireless communication device communication resources for the second network slice. Further, when communication resources are granted for the first and the second network slice, the sending 306 comprises sending, to the wireless communication device 140, information on the communication resources granted to use for communication over the selected first and second network slices.

According to an embodiment, the information on the network capabilities is sent 302 to a slice broker functionality of the wireless communication device, the request for communication resources is received 304 from the slice broker functionality and the information on the granted communication resources is sent 308 to the slice broker functionality. In other words, the system performing the method communicates with a slice broker functionality of the wireless communication device 140. The system may also inform 309 the slice broker functionality of the non-grant of communication resources.

In 3GPP TS 23.501 it is described how Network Slice registration is defined to work today from the perspective of a UE, which is an LTE type of wireless communication device. The following paragraph describes how network slices having different capabilities in terms of e.g. latency, bandwidth and reliability can be created and provided to the UE. However, this paragraph does not describe how the UE can select network slice types, which we will describe embodiments of in the later paragraphs.

According to 3GPP TS 23.501, a UE Context is instantiated within the RAN at the time the UE becomes active and establishes a logical control connection RRC connected mode. Identification of a Network Slice is done via a Single Network Slice Selection Assistance Information (S-NSSAI). The NSSAI (Network Slice Selection Assistance Information) is a collection of S-NSSAIs. The network slice is created in the wireless communication network with following components, in order to modify capabilities of the network slice parameters:
  Radio resource schedule allocating Radio Resource Blocks to the UE;
  Radio bearer control (RBC) managing the establishment, the maintenance, and the release of radio bearers which involve the configuration of radio resources associated. The RBC considers Quality of Service (QoS) requirements;
  Radio admission control (RAC): Ensures high radio resource utilization and a correct QoS for the slice RAC admits or rejects establishment requests
  Dynamic Resource Allocation or Packet Scheduling allocates resources including buffering and processing resources and resource blocks to user and control plane packets.

Link adaptation and power allocation determines the power allocation. QoS flow is the finest granularity of QoS differentiation in a Packet Data unit (PDU) session. A QoS Flow ID (QFI) is used to identify a QoS flow in the 5G system. User Plane traffic with the same QFI within a PDU session receives the same traffic forwarding treatment, e.g. scheduling, admission threshold. The QFI is carried in an encapsulation header on N3 (and N9) i.e. without any changes to the e2e packet header. It can be applied to PDUs with different types of payload, i.e. IP packets, non-IP PDUs and Ethernet frames. The QFI shall be unique within a PDU session. The above described flexible components enable to create different capabilities for the radio part of the network slice.

Figure 4:
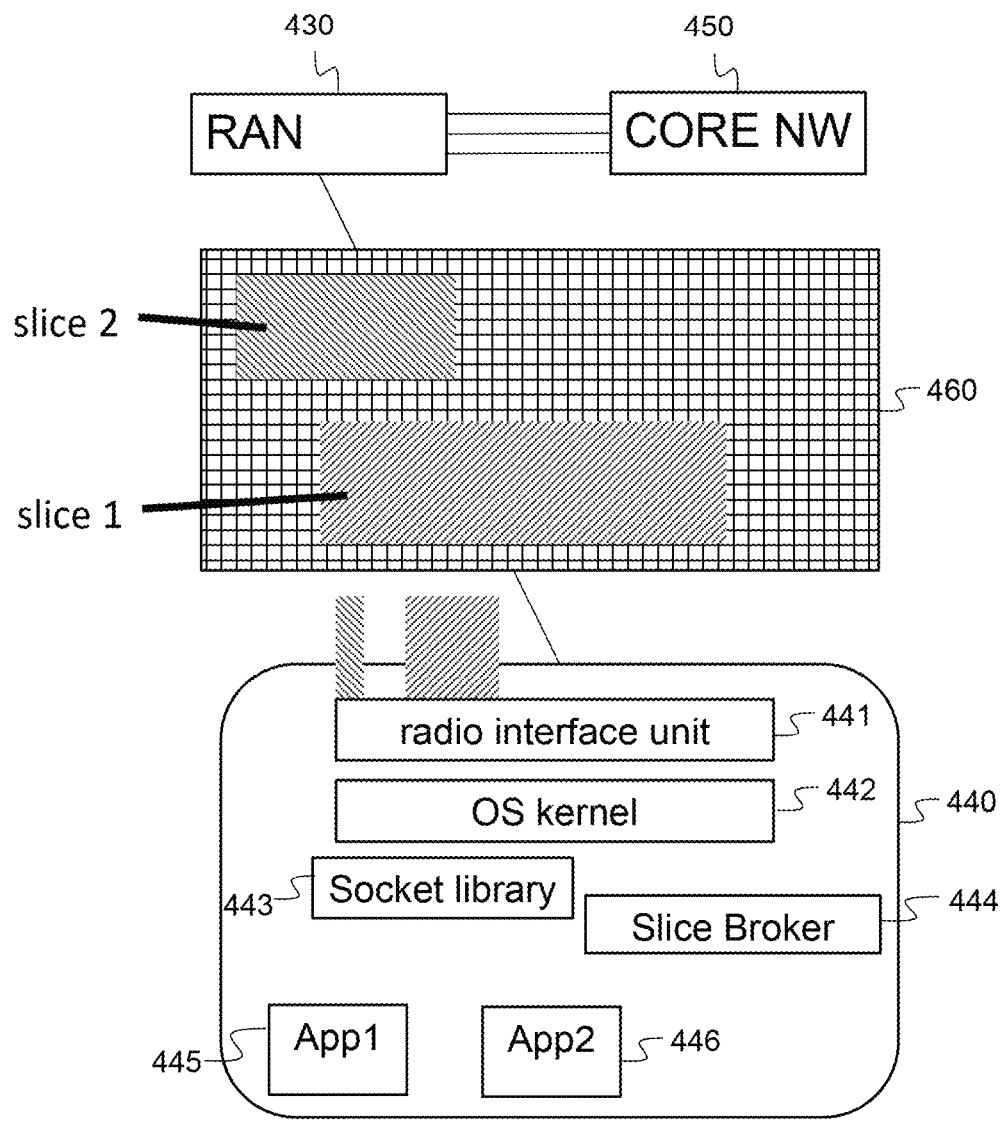
FIG. 4 is schematic block diagram of a wireless communication device configured for communication with a wireless communication network according to possible embodiments.

In the following, an embodiment of the invention is described. In this embodiment, a so called slice broker concept is introduced in the wireless communication device. FIG. 4 illustrates such a slice broker concept of a wireless communication device 440 being in communication with a wireless communication network comprising a radio access network (RAN) 430 and a core network 450. The plurality of lines between the RAN 430 and the core network 450 symbolizes that there may be different links for different network slices. The grid in FIG. 4 symbolizes a radio spectrum 460 in time and frequency available for communication over a wireless interface between the wireless communication device 440 and the RAN 430. "Slice 1" symbolizes radio resources in such a radio spectrum 460 that are to be used for a first network slice that is offered to the wireless communication device. "Slice 2" symbolizes radio resources in such a radio spectrum 460 that are to be used for a second network slice that is offered to the wireless communication device 440. The wireless communication device 400 in this embodiment comprises a radio interface unit 441 for handling of the radio communication within the RAN The wireless communication device 440 further comprises an Operative System (OS) Kernel 442, which is a computer program that is the core of a computer's operating system controlling functions of the wireless communication device, a Socket Library 443, a Slice Broker 444 and two application programs: App1 445 and App2 446 which have been downloaded onto the communication device 440.

Figure 5:
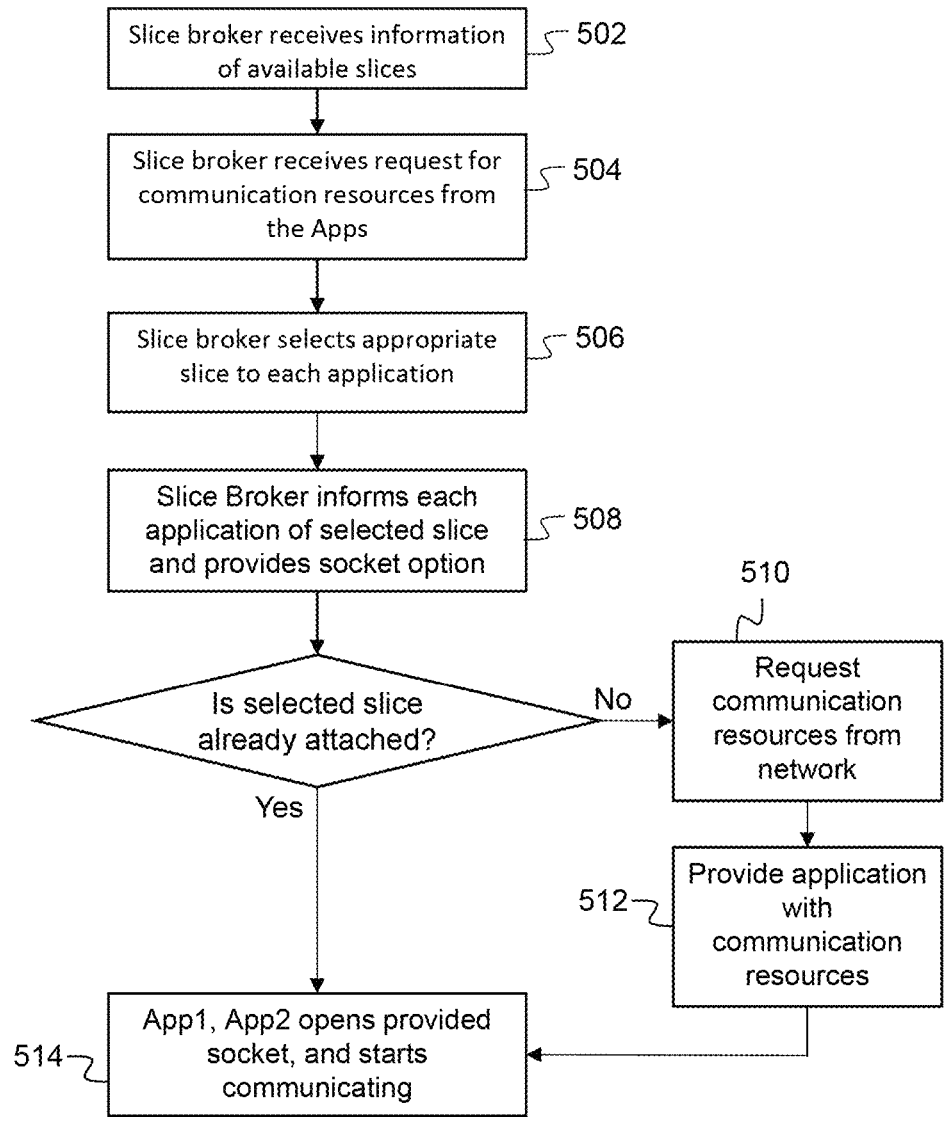
FIG. 5 is a flow chart illustrating a method performed by a wireless communication device, according to further possible embodiments.

The slice broker 444 is a new function, aka functionality aka unit, that according to this embodiment is introduced into the wireless communication device 440 for handling selection of network slices in the communication device. FIG. 5 in connection with FIG. 4 shows an embodiment of a method for implementing the described concept of network slice handling at the wireless communication device. When the wireless communication device 440 connects to the wireless communication network, via a base station of the RAN 430, the slice broker 444 receives 502 information of available network slices from the wireless communication network, the information comprising the capabilities of the available network slices. The core network 450 may provide the slice broker 444 with the information of available network slices via the base station of the RAN 430 that the wireless communication device 440 is connected to. When multiple network slices are realized over shared radio resources, such as the radio spectrum 460 of FIG. 4, a Radio Resource Management (RRM) function in the wireless communication network will assure that each network slice gets the expected amount of resources according to its capabilities, such as a certain latency and/or bandwidth.

The application programs 445, 446 may have been downloaded to the wireless communication device in advance or may be downloaded to the wireless communication device after the reception of the information of available network slices. The downloading may be performed via an app store (not shown) configured on the communication device 440. When an application program (in the example of FIG. 4 the application programs 445, 446) is to be used, each application program requests 504 communication resources from the slice broker 444 and, at the same time or at another time point, provides the slice broker with its capability preferences. The slice broker 444 then matches the capability preferences of each application program 445, 446 with the capabilities of the available network slices and selects 506 a network slice to each application based on the matching. The slice broker 444 then informs 508 each application 445, 446 of its respective selected slice and the capabilities of the selected slice and provides a socket option. In case the application accepts the selected slice, and in case the network resources of the selected slice is already attached to the wireless communication device, the application opens 514 the socket and starts communicating via the selected slice. In case the slice is not attached, the Slice broker 444 contacts the communication network via the RAN 430 and requests 510 communication resources for the selected slices and, when receiving the communication resources, provides 512 the application with the communication resources received from the network before the application can open 514 the provided socket and start communicating over the selected slice.

Further, according to an embodiment, it is proposed to extend permissions of the operating system of the OS Kernel 442 with a structure defined as follows and exposing this structure to the Slice Broker 444 through a Permissions API of the OS so that the Slice Broker can compare the capabilities provided by the network slices to the requested capabilities of the applications:

Typedef slice_t {Capabilities_t cap; Services_t serv} where the constituents are defined as structures composed of enumerated types as follows:

Typedef Capabilities_t {Latency_t lat, Security_t sec, Eneff_t en, Mobility_t mob, Mcon_t mc, Reach_t reach, Gqos_t gqos, Throughput_t tput}, wherein Eneff signifies Energy efficiency, Mcon Massive connectivity and Gqos Guaranteed QoS;

Typedef Services_t {EdgeComputing_t ec, DynamicCharging_t dc, IDManagement_t idmgt}.

The "Typedef Services" is to show for the Slice Broker which slice is appropriate for which service so that the slice broker also can compare services provided by the applications with services suitable to be provided by the network slices.

According to another embodiment, applications can be granted permission to ask for being connected to a network slice having certain capabilities and being adapted for providing certain services. The Slice Broker 444 manages the permission settings for network slices in the OS kernel 442 of the UE. According to an embodiment, it may be possible to allow a user of the UE to give or deny permissions for particular network slice types or services for its applications. This may be managed via the Graphical User Interface (GUI) of the UE.

According to yet another embodiment, an operator of a wireless communication network may configure the Slice Broker 444 in the UE to enable or disable access for applications to network slices with particular Capabilities and Services.

According to another embodiment, a newly downloaded application can register with the Slice Broker 444 when asking the OS kernel 442 regarding its permissions to access different types of slices. Upon successful registration, the Application receives a list of Network slice IDs along with slice_t descriptions of each of the slices that it could access. It should be noted that one Application may access several slices simultaneously by opening for example different socket connections using the extended socket API described in the following.

According to another embodiment, the Slice Broker could be implemented in Android© as an extension to the android-.net class in the Android© OS, see https://developerandroid-.com/reference/android/net/ConnectivityManager.html. The Application manifest may then have to include the following permission: android.intent.action.MANAGE_NETWORK_USAGE. One way to allow specifying how to connect to a particular slice is by extending standard socket permissions. For a Java implementation (like that in the Android© OS), java.net.StandardSocketOptions is extended with a SocketOption<Integer> Slice_ID member. When the connection is open and as long as it remains open, this should match the ID of one of the slices that the Application is allowed to use by the Slice Broker.

In 3GPP TS 23.503, the following policies are defined for managing network slices:

UE Route Selection Policy (URSP): This policy is used by the UE to determine if a detected application can be associated to an established PDU Session, can be offloaded to non-3GPP access outside a PDU Session, or can trigger the establishment of a new PDU Session. The structure and the content of this policy are specified in 3GPP TS 23.503 clause 6.6.2. The URSP rules include traffic descriptors that specify the matching criteria for route selection and one or more of the following components:

Spread-Spectrum Clocking Mode Selection Policy (SS-CMSP): This policy is used by the UE to associate the matching application with SSC modes Network Slice Selection Policy (NSSP): This policy is used by the UE to associate the matching application with S-NSSAI.

According to an embodiment, a PCF in the core network selects an Access Network Discovery and Selection Policy (ANDSP) and the URSP applicable for each UE based on local configuration and operator policies taking into consideration e.g. accumulated usage, load level information per network slice instance and UE location. For a component which contains a list of values (e.g. Network Slice Selection), the value of the PDU Session has to be identical to one of the values specified in a description of a Route Selection Descriptor.

According to an embodiment, when a PDU Session already exists for the UE for a network slice that has capabilities matching the capabilities that the application wants, the UE associates the application to the existing PDU Session, i.e. route the traffic of the detected application on this PDU Session.

According to another embodiment, when the UE determines that there is more than one existing PDU Session that matches, e.g. the selected Route Selection Descriptor only specifies the Network Slice Selection, while there are multiple existing PDU Sessions matching the Network Slice Selection with different Data Network Names (DNN), it is up to UE implementation to select one of them to use for the application. Different embodiments how this selection could be achieved is described in the above paragraphs related to the description of FIGS. 4 and 5.

By using one or more of the above described policies, an additional level of flexibility is created that allows users to modify policies that are offered by the network.

According to an embodiment, the slice broker 444 compiles a traffic matching part of the policies based on traffic characteristics and uploads the information to a rule engine URSP.

Based on one or more of the above described embodiment, the following scenarios, among many more possible, can be accomplished:
- The user will be able to choose how good a slice he wants to pay for e.g. Spotify© traffic versus a slice for e.g. Netflix©;
- The user can move e.g. the Spotify© traffic to a lower priority slice while streaming from e.g. Eurosport© in case the image gets repeatedly bad.

Further, based on one or more of the embodiments shown above, it will be possible to:
- Allow the usage of certain network slice ids for certain applications only
- Allow applications to request, or mandate, certain network slice characteristics.
- Provide the possibility for applications to know if they got the network slice capabilities they require—dynamically, as it may change due to mobility.
- Allow operators to have differentiated charging plans for different network slices while not requiring dedicated wireless communication devices for its use. E.g. a "standard wireless communication device" with the above described function can be using a normal eMBB slice for all traffic except some work-related application that needs URLLC characteristics
- Enable more common usage of otherwise specialized network slices making it possible for an operator to for instance sell packages of e.g. URLLC+eMBB bandwidth where a game on a wireless communication device uses the URLLC slice while most other applications on that wireless communication devices use the standard eMBB network slice.
- Enable enterprise/corporate customers to ensure enforcement of network slice connectivity policies for selected enterprise/corporate applications.

Figure 6:
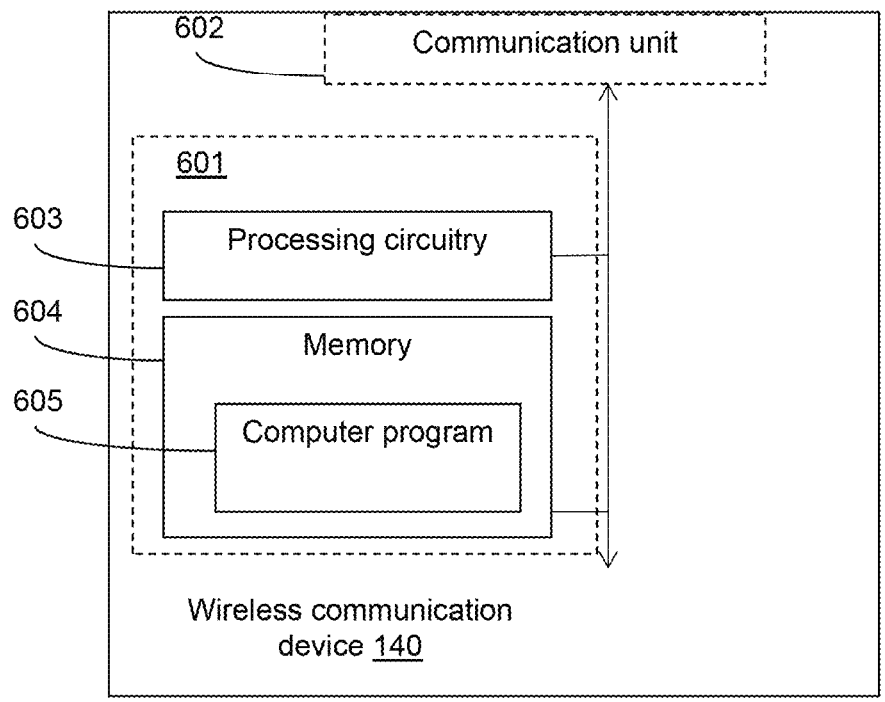
FIG. 6 is a schematic block diagram of a wireless communication device according to possible embodiments.

FIG. 6, in conjunction with FIG. 1, describes an embodiment of a wireless communication device 140 configured to communicate with a wireless communication network 100, the network having a plurality of network slices available for providing wireless access to the wireless communication device 140. The plurality of network slices have mutually different network capabilities in terms of e.g. latency, bandwidth and reliability. The wireless communication device 140 comprises a processing circuitry 603 and a memory 604. The memory contains instructions executable by said processing circuitry, whereby the wireless communication device 140 is operative for receiving, from the wireless communication network 100, information on the network capabilities of the plurality of available network slices and obtaining a request from an application program of the wireless communication device 140 for communication resources for communicating through the wireless communication network 100. The wireless device is further operative for obtaining information on network capability preferences of the application program, and selecting a network slice from the plurality of network slices for the application program based on the information on network capabilities of the plurality of available network slices and on the information on network capability preferences of the application program. The wireless device is further operative for sending a request to the wireless communication network 100 for communication resources to use for communication over the selected network slice, and receiving, from the wireless communication network 100, information on the communication resources to use for communication over the selected network slice.

According to an embodiment, the wireless communication device 140 is further operative for informing the application program of the network capabilities of the selected network slice, and receiving, in response to the informing, an acknowledgement or a non-acknowledgement from the application program of the selected network slice, and only sending a request to the wireless communication network for communication resources to use for communication over the selected network slice when an acknowledgement is received.

According to another embodiment, the wireless communication device 140 is operative for selecting network slice based on user preferences of network capabilities of a user of the wireless communication device, as well as on the network capability preferences of the application program.

According to another embodiment, the wireless communication device 140 is further operative for obtaining information on the user preferences from a user interface of the wireless communication device or from a stored user preference profile.

According to another embodiment, the application program comprises a first application program and at least a second application program and the first application program has first network capability preferences and the second application program has second network capability preferences. Further, the wireless communication device is operative for selecting network slice by selecting a first of the plurality of network slices for the first application program and a second of the plurality of network slices for the second application program. Also, the wireless communication device is operative for sending a request for communication resources by sending a request to the wireless communication network for communication resources to use for communication over the first network slice for the first application program and for communication resources to use for communication over the second network slice for the second application program. Further, the wireless communication device is operative for receiving information on communication resources by receiving information on the communication resources to use for communication over the first network slice and by receiving information on the communication resources to use for communication over the second network slice.

According to another embodiment, the wireless communication device 140 is further operative for translating the information related to network capability preferences of an application program into information comparable to the information on network capabilities of the plurality of available network slices.

According to another embodiment, the wireless communication device 140 is further operative for obtaining, from the application program, a suggested network slice from the available network slices. Further, the communication device is operative for taking the suggested network slice into consideration when performing the selection of network slice.

According to another embodiment, the wireless communication device 140 comprising slice broker functionality that is operative to perform the receiving of information on the network capabilities, the obtaining of a request from an application program, the obtaining of information on network capability preferences of the application program, the selecting of a network slice, the sending of a request to the wireless communication network and the receiving of information on the communication resources to use for communication. The slice broker functionality may further be operative to perform one or more of the embodiments referred to in the description of FIG. 6 above.

According to other embodiments, the wireless communication device 140 may further comprise a communication unit 602, which may be considered to comprise conventional means for wireless communication with the wireless communication network 100, such as a transceiver for wireless transmission and reception of wireless signals. The instructions executable by said processing circuitry 603 may be arranged as a computer program 605 stored e.g. in said memory 604. The processing circuitry 603 and the memory 604 may be arranged in a sub-arrangement 601. The sub-arrangement 601 may be a micro-processor and adequate software and storage therefore, a Programmable Logic Device, PLD, or other electronic component(s)/processing circuit(s) configured to perform the methods mentioned above. The processing circuitry 603 may comprise one or more programmable processor, application-specific integrated circuits, field programmable gate arrays or combinations of these adapted to execute instructions.

The computer program 605 may be arranged such that when its instructions are run in the processing circuitry, they cause the wireless communication device 140 to perform the steps described in any of the described embodiments of the wireless communication device 140 and its method. The computer program 605 may be carried by a computer program product connectable to the processing circuitry 603. The computer program product may be the memory 604, or at least arranged in the memory. The memory 604 may be realized as for example a RAM (Random-access memory), ROM (Read-Only Memory) or an EEPROM (Electrical Erasable Programmable ROM). Further, the computer program 605 may be carried by a separate computer-readable medium, such as a CD, DVD or flash memory, from which the program could be downloaded into the memory 604. Alternatively, the computer program may be stored on a server or any other entity to which the wireless communication device 140 has access via the communication unit 602. The computer program 605 may then be downloaded from the server into the memory 604.

Figure 7:
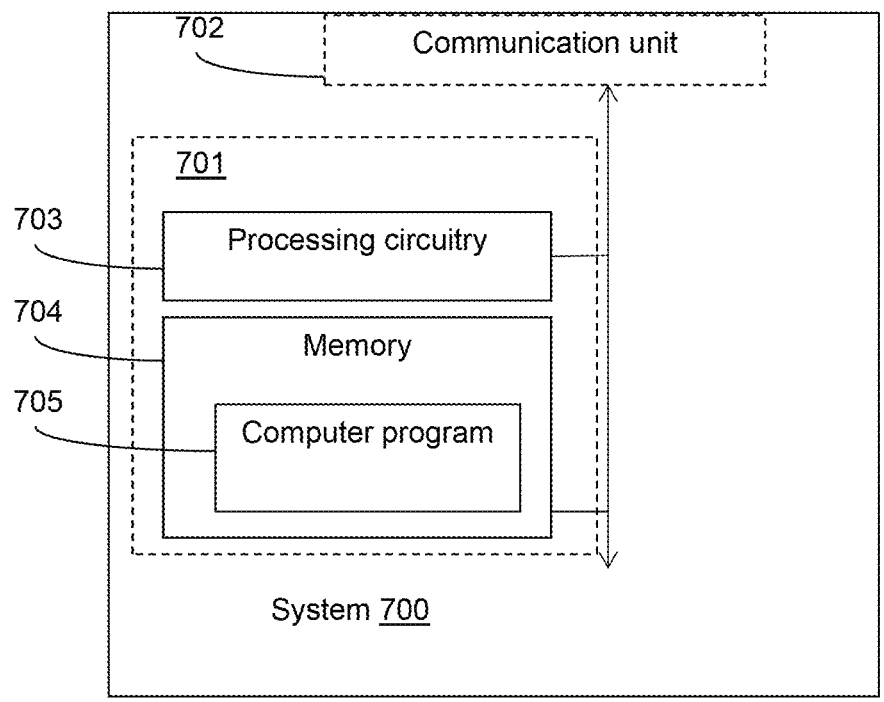
FIG. 7 is a schematic block diagram of a system of a wireless communication network according to possible embodiments.

FIG. 7, in conjunction with FIG. 1, describes an embodiment of a system 700 operable in a wireless communication network 100 for providing wireless access to a wireless communication device 140. The communication network 100 has a plurality of network slices available for providing radio access to the wireless communication device 140. The plurality of network slices have mutually different network capabilities in terms of e.g. latency, bandwidth and reliability. The system 700 comprises a processing circuitry 703 and a memory 704. The memory contains instructions executable by said processing circuitry, whereby the system 700 is operative for sending, to the wireless communication device 140, information on the network capabilities of the plurality of available network slices, and receiving, from the wireless communication device 140, a request for communication resources to use for communication over a network slice selected by the wireless communication device from the plurality of network slices, for an application program. The system 700 is further operative for determining whether to grant the wireless communication device 140 communication resources for the selected network slice, and, when communication resources are granted, sending, to the wireless communication device 140, information on the granted communication resources to use for communication over the selected slice.

The system 700 of the wireless communication network that performs the method may be a network node, such as a node of the core network 150 or a node of the radio access network 130, or a physical or virtual unit in the network node. For example, the system may be the PCF 145, or a part of the PCF 145. In this case, the node of the core network, e.g. the PCF 145, communicates with the wireless communication device 140 via the RAN node 135 to which the communication device 140 has a radio connection. Alternatively, the system of the wireless communication network that performs the method may be a group of network nodes, wherein functionality for performing the method are spread out over different physical, or virtual, nodes of the network. In other words, the system may be implemented as a cloud-solution, i.e. the system may be deployed as cloud computing resources that may be distributed in the communication network.

According to an embodiment, the system 700 is further operative for, when communication resources are not granted, informing the wireless communication device 140 of the non-grant of communication resources.

According to another embodiment, the system 700 is further operative for receiving a request for communication resources by receiving a first request for communication resources to use for communication over a first network slice selected by the wireless communication device 140 from the plurality of network slices for a first application program, and by receiving a second request for communication resources to use for communication over a second network slice selected by the wireless communication device from the plurality of network slices for a second application program, and wherein the system is operative for determining whether to grant communication resources by determining whether to grant the wireless communication device communication resources for the first network slice and by determining whether to grant the wireless communication device communication resources for the second network slice, and when communication resources are granted for the first and the second network slice, the system is operative for sending (information on the granted communication resources by sending, to the wireless communication device 140, information on the communication resources granted to use for communication over the selected first and second network slices.

According to another embodiment, the system is further operative to send the information on the network capabilities to a slice broker functionality of the wireless communication device 140, to receive the request for communication resources from the slice broker functionality and to send the information on the granted communication resources to the slice broker functionality.

According to other embodiments, the system 700 may further comprise a communication unit 702, which may be considered to comprise conventional means for communication with other nodes in the communication network 100. In case the system 700 is implemented in the RAN node 135 providing wireless access to the wireless communication device 140, the communication unit 702 may also comprise wireless communication means, such as a transceiver for wireless transmission and reception of signals with the wireless communication device 140. The instructions executable by said processing circuitry 703 may be arranged as a computer program 705 stored e.g. in said memory 704. The processing circuitry 703 and the memory 704 may be arranged in a sub-arrangement 701. The sub-arrangement 701 may be a micro-processor and adequate software and storage therefore, a Programmable Logic Device, PLD, or other electronic component(s)/processing circuit(s) configured to perform the methods mentioned above. The processing circuitry 703 may comprise one or more programmable processor, application-specific integrated circuits, field programmable gate arrays or combinations of these adapted to execute instructions.

The computer program 705 may be arranged such that when its instructions are run in the processing circuitry, they cause the system 700 to perform the steps described in any of the described embodiments of the system 700 and its method. The computer program 705 may be carried by a computer program product connectable to the processing circuitry 703. The computer program product may be the memory 704, or at least arranged in the memory. The memory 704 may be realized as for example a RAM (Random-access memory), ROM (Read-Only Memory) or an EEPROM (Electrical Erasable Programmable ROM). Further, the computer program 705 may be carried by a separate computer-readable medium, such as a CD, DVD or flash memory, from which the program could be downloaded into the memory 704. Alternatively, the computer program may be stored on a server or any other entity to which the system 700 has access via the communication unit 702. The computer program 705 may then be downloaded from the server into the memory 704.

Although the description above contains a plurality of specificities, these should not be construed as limiting the scope of the concept described herein but as merely providing illustrations of some exemplifying embodiments of the described concept. It will be appreciated that the scope of the presently described concept fully encompasses other embodiments which may become obvious to those skilled in the art, and that the scope of the presently described concept is accordingly not to be limited. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for an apparatus or method to address each and every problem sought to be solved by the presently described concept, for it to be encompassed hereby. In the exemplary figures, a broken line generally signifies that the feature within the broken line is optional.

The invention claimed is:

1. A method performed by a wireless communication device for communicating with a wireless communication network, the network having a plurality of network slices available for providing wireless access to the wireless communication device, the plurality of network slices having mutually different network capabilities, the method comprising:
   receiving, from the wireless communication network, information on the network capabilities of the plurality of available network slices;
   obtaining a request from an application program of the wireless communication device for communication resources for communicating through the wireless communication network;
   obtaining information on network capability preferences of the application program;
   selecting, by a slice broker in the wireless communication device, a network slice from the plurality of network slices for the application program based on the information on network capabilities of the plurality of available network slices and on the information on network capability preferences of the application program;
   sending a request to the wireless communication network for communication resources to use for communication over the selected network slice; and
   receiving, from the wireless communication network, information on the communication resources to use for communication over the selected network slice.

2. The method according to claim 1, further comprising:
   informing the application program of the network capabilities of the selected network slice; and
   receiving, in response to the informing, an acknowledgement or a non-acknowledgement from the application program of the selected network slice, and only sending a request to the wireless communication network for communication resources to use for communication over the selected network slice when an acknowledgement is received.

3. The method according to claim 1, wherein the selection of network slice is based on user preferences of network capabilities of a user of the wireless communication device, as well as on the network capability preferences of the application program.

4. The method according to claim 3, further comprising:
   obtaining information on the user preferences from a user interface of the wireless communication device or from a stored user preference profile.

5. The method according to claim 1, wherein the application program comprises a first application program and at least a second application program and wherein the first application program has first network capability preferences and the second application program has second network capability preferences, and wherein the selecting comprises selecting a first of the plurality of network slices for the first application program and a second of the plurality of network slices for the second application program, and the sending comprises sending a request to the wireless communication network for communication resources to use for communication over the first network slice for the first application program and for communication resources to use for communication over the second network slice for the second application program, and the receiving of information on communication resources comprises receiving information on the communication resources to use for communication over the first network slice and information on the communication resources to use for communication over the second network slice.

6. The method according to claim 1, further comprising:
translating the information related to network capability preferences of an application program into information comparable to the information on network capabilities of the plurality of available network slices.

7. The method according to claim 1, further comprising:
obtaining, from the application program, a suggested network slice from the available network slices,
and wherein the wireless communication device takes the suggested network slice into consideration when performing the selection of network slice.

8. A method performed by a system of a wireless communication network for providing wireless access to a wireless communication device, the communication network having a plurality of network slices available for providing wireless access to the wireless communication device, the plurality of network slices having mutually different network capabilities, the method comprising:
sending, to a slice broker in the wireless communication device, information on the network capabilities of the plurality of available network slices;
receiving, from the slice broker in the wireless communication device, a request for communication resources to use for communication over a network slice selected by the wireless communication device from the plurality of network slices, for an application program; and
determining whether to grant the wireless communication device communication resources for the selected network slice, and, when communication resources are granted:
sending, to the slice broker in the wireless communication device, information on the granted communication resources to use for communication over the selected slice.

9. The method according to claim 8, further comprising, when communication resources are not granted, informing the wireless communication device of the non-grant of communication resources.

10. The method according to claim 8, wherein the receiving comprises receiving a first request for communication resources to use for communication over a first network slice selected by the wireless communication device from the plurality of network slices for a first application program, and receiving a second request for communication resources to use for communication over a second network slice selected by the wireless communication device from the plurality of network slices for a second application program, and the determining comprises determining whether to grant the wireless communication device communication resources for the first network slice and whether to grant the wireless communication device communication resources for the second network slice, and when communication resources are granted for the first and the second network slice, the sending comprises sending, to the wireless communication device, information on the communication resources granted to use for communication over the selected first and second network slices.

11. A wireless communication device configured to communicate with a wireless communication network, the network having a plurality of network slices available for providing wireless access to the wireless communication device, the plurality of network slices having mutually different network capabilities, the wireless communication device comprising a processing circuitry and a memory, said memory containing instructions executable by said processing circuitry, whereby the wireless communication device is operative for:
receiving by a slice broker in the wireless communication device, from the wireless communication network, information on the network capabilities of the plurality of available network slices;
obtaining a request from an application program of the wireless communication device for communication resources for communicating through the wireless communication network;
obtaining by the slice broker information on network capability preferences of the application program;
selecting by the slice broker a network slice from the plurality of network slices for the application program based on the information on network capabilities of the plurality of available network slices and on the information on network capability preferences of the application program;
sending a request to the wireless communication network for communication resources to use for communication over the selected network slice; and
receiving by the slice broker, from the wireless communication network, information on the communication resources to use for communication over the selected network slice.

12. The wireless communication device according to claim 11, further being operative for:
informing the application program of the network capabilities of the selected network slice; and
receiving, in response to the informing, an acknowledgement or a non-acknowledgement from the application program of the selected network slice, and only sending a request to the wireless communication network for communication resources to use for communication over the selected network slice when an acknowledgement is received.

13. The wireless communication device according to claim 11, operative for selecting network slice based on user preferences of network capabilities of a user of the wireless communication device, as well as on the network capability preferences of the application program.

14. The wireless communication device according to claim 13, further being operative for:
obtaining information on the user preferences from a user interface of the wireless communication device or from a stored user preference profile.

15. The wireless communication device according to claim 11, wherein the application program comprises a first application program and at least a second application program and wherein the first application program has first network capability preferences and the second application program has second network capability preferences, and wherein the wireless communication device is operative for selecting network slice by selecting a first of the plurality of network slices for the first application program and a second of the plurality of network slices for the second application program, and wherein the wireless communication device is operative for sending a request for communication resources by sending a request to the wireless communication network for communication resources to use for communication over the first network slice for the first application program and for communication resources to use for communication over the second network slice for the second application program, and wherein the wireless communication device is operative for receiving information on communication resources by receiving information on the communication resources to use for communication over the first network slice and information on the communication resources to use for communication over the second network slice.

16. The wireless communication device according to claim 11, further being operative for:

translating the information related to network capability preferences of an application program into information comparable to the information on network capabilities of the plurality of available network slices.

17. The wireless communication device according to claim 11, further being operative for:

obtaining, from the application program, a suggested network slice from the available network slices, and wherein the wireless communication device is operative for taking the suggested network slice into consideration when performing the selection of network slice.

18. A system operable in a wireless communication network for providing wireless access to a wireless communication device, the communication network having a plurality of network slices available for providing radio access to the wireless communication device, the plurality of network slices having mutually different network capabilities, the system comprising a processing circuitry and a memory, said memory containing instructions executable by said processing circuitry, whereby the system is operative for:

sending, to a slice broker in the wireless communication device, information on the network capabilities of the plurality of available network slices;

receiving, from the slice broker in the wireless communication device, a request for communication resources to use for communication over a network slice selected by the wireless communication device from the plurality of network slices, for an application program; and determining whether to grant the wireless communication device communication resources for the selected network slice, and, when communication resources are granted:

sending, to the slice broker in the wireless communication device, information on the granted communication resources to use for communication over the selected slice.

19. The system according to claim 18, further being operative for, when communication resources are not granted, informing the wireless communication device of the non-grant of communication resources.

20. The system according to claim 18, operative for receiving a request for communication resources by receiving a first request for communication resources to use for communication over a first network slice selected by the wireless communication device from the plurality of network slices for a first application program, and by receiving a second request for communication resources to use for communication over a second network slice selected by the wireless communication device from the plurality of network slices for a second application program, and wherein the system is operative for determining whether to grant communication resources by determining whether to grant the wireless communication device communication resources for the first network slice and by determining whether to grant the wireless communication device communication resources for the second network slice, and when communication resources are granted for the first and the second network slice, the system is operative for sending to the wireless communication device, information on the communication resources granted to use for communication over the selected first and second network slices.

\* \* \* \* \*